United States Patent [19]

Husted et al.

[11] Patent Number: 5,102,633

[45] Date of Patent: Apr. 7, 1992

[54] METHOD FOR REDUCING IMPURITIES IN HEXAMMINE COBALT HALIDE COMPOUNDS

[75] Inventors: Eric F. Husted, Ulster; Michael J. Miller, Towanda; Shellie K. Northrop, Sayre; David T. Smith, LeRaysville, all of Pa.

[73] Assignee: GTE Products Corporation, Stamford, Conn.

[21] Appl. No.: 703,211

[22] Filed: May 20, 1991

[51] Int. Cl.⁵ .............................................. C01G 51/12
[52] U.S. Cl. ...................................... 423/143; 423/138; 423/140; 423/144; 423/155; 423/163; 423/158; 423/324; 423/462; 423/463
[58] Field of Search ............... 423/138, 140, 144, 143, 423/155, 165, 158, 324, 462, 463; 210/757

[56] References Cited

U.S. PATENT DOCUMENTS

| | | | |
|---|---|---|---|
| 4,214,894 | 7/1980 | Ritsko et al. | 423/143 |
| 4,214,896 | 7/1980 | Cheresnowsky | 423/143 |
| 4,594,230 | 6/1986 | Scheithauer et al. | 423/140 |
| 4,840,775 | 6/1989 | Husted | 423/150 |
| 4,840,776 | 6/1989 | Husted | 423/150 |

*Primary Examiner*—Theodore Morris
*Assistant Examiner*—Edward Squillante
*Attorney, Agent, or Firm*—Elizabeth A. Levy

[57] ABSTRACT

A method for reducing impurity levels of calcium, magnesium and/or silicon in hexammine cobalt halide compounds involves the addition of ferric ions and, optionally, soluble fluorides to an aqueous hexammine cobalt (III) chloride solution having a pH of at least 9. Insoluble compounds of magnesium fluoride, calcium fluoride, and/or ferric hydroxide and silicon coprecipitates are removed from the solution by filtration.

16 Claims, No Drawings

METHOD FOR REDUCING IMPURITIES IN HEXAMMINE COBALT HALIDE COMPOUNDS

TECHNICAL FIELD

This invention relates to methods for reducing impurity levels of hexammine cobalt halide compounds so that they may be further processed to produce highly pure cobalt metal powder.

BACKGROUND OF THE INVENTION

Cobalt-containing solutions, such as sludges and leach solutions from cemented carbide or tungsten recovery operations, may be processed to recover cobalt metal powder. It is desirable to remove from the resulting cobalt metal powder any impurities, such as calcium, magnesium and/or silicon, which may adversely affect the performance of cobalt when it is used as a binder in cemented carbides.

U.S. Pat. Nos. 4,214,895 to Gingerich et al., 4,690,710 to Scheithauer et al., and 4,612,039 to Scheithauer et al. describe methods for producing pure cobalt metal powder. U.S. Pat. No. 4,218,240 to Gingerich et al. describes a method for making hexammine cobaltic compounds and a method for making pure cobalt metal powder therefrom.

SUMMARY OF THE INVENTION

It is an object of this invention to provide a method of reducing impurity levels of calcium, magnesium and/or silicon, from pure hexammine cobalt halide compounds.

According to one aspect of the invention, there is provided a method for purifying hexammine cobalt halide compounds containing the impurities calcium, magnesium and/or silicon, comprising the steps of: adjusting the pH of an aqueous hexammine cobalt halide solution to at least 9; adding sufficient soluble fluoride to form insoluble fluoride compounds of any magnesium and/or calcium impurities; adding ferric ions to the aqueous hexammine cobalt halide solution to form insoluble compounds of ferric hydroxide and any silicon impurity; and filtering the aqueous hexammine cobalt halide solution to obtain a purified aqueous hexammine cobalt halide solution.

According to another aspect of the invention, there is provided a method for purifying hexammine cobalt halide compounds containing the impurities calcium, magnesium and/or silicon, comprising the steps of: adjusting the pH of an aqueous hexammine cobalt halide solution to at least 9; adding ferric ions to the aqueous hexammine cobalt halide solution to form insoluble compounds of ferric hydroxide and any silicon impurity; and filtering the aqueous hexammine cobalt halide solution to obtain a purified aqueous hexammine cobalt halide solution.

DETAILED DESCRIPTION OF THE INVENTION

Hexammine cobalt halide compounds from cemented carbide or tungsten recovery operations are a source material for the recovery of pure metal cobalt powder. The preparation of hexammine cobalt compounds is described in U.S. Pat. No. 4,218,240 to Gingerich et al. and is hereby incoporated by reference.

Silicon as an impurity in cobalt-containing feed streams may cause porosity in cemented carbides in which cobalt powder is used as a binder material. Such porosity weakens the cemented carbide material and is therefore undesirable. Impurity levels of silicon may range from 100 to 700 parts per million on a cobalt metal basis.

Other impurities, such as calcium and/or magnesium, may be present in cobalt-containing feed streams in concentrations of 0.05–0.5% calcium and 0.5% magnesium on a cobalt metal basis. These impurities also adversely affect the properties of cobalt powder binders and are therefore undesirable.

Hexammine cobalt halide compounds, such as hexammine cobalt (III) chloride, or $Co(NH_3)_6Cl_3$, which contain such impurities as calcium, magnesium and/or silicon, are treated with a caustic reagent and metallic salts to reduce silicon impurity levels. A preferred caustic reagent is sodium hydroxide, available in either "rayon" grade or "diaphragm cell" grade from, for example, Olin Chemicals or Occidental Chemical Corporation. It is desirable to use highly concentrated sodium hydroxide, or caustic soda, so that sufficient hydroxide ions are available to combine with ferric ions to form insoluble ferric hydroxides on which the silicon may adsorb. The preferred metallic salt is ferric chloride.

Excess quantities of any soluble fluoride may also be added to the hexammine cobalt chloride solution to form insoluble compounds of calcium fluoride and magnesium fluoride, which are then removed from the solution by filtration. A preferred soluble fluoride is sodium fluoride, available in technical grade from Olin Chemicals. The sodium fluoride should be added in concentrations of at least 3.6 grams of sodium fluoride per liter of cobalt solution.

The addition of ferric ions ($Fe^{+3}$) to aqueous hexammine cobalt (III) chloride solutions acts to suppress the solubility of silicon in the solution. At a solution pH of at least 9 and in the presence of ferric ions in a concentration of at least 50 grams of ferric ions per liter of solution, insoluble compounds of ferric hydroxide are formed. While not wishing to be bound by theory, it is believed that silicon is adsorbed on the surfaces of these ferric hydroxide compounds and are thereby removed from the solution during filtration.

It is desirable to maintain the pH of the solution at greater than 9 and preferably between 9.4 and 9.8. This is accomplished by the addition of sodium hydroxide to the solution until the desired pH range is obtained.

As the concentration of ferric ions in the aqueous hexammine cobalt (III) chloride solution increases, the silicon solubility in the resulting filtrate decreases. A ferric ion concentration of 1000 milligrams of ferric ions per liter of solution has been shown to decrease the silicon impurity level to as low as 20 parts per million on a cobalt metal basis.

The following non-limiting examples are presented.

EXAMPLE I

Five hundred milliliters of aqueous hexammine cobalt (III) chloride solution, $Co(NH_3)_6Cl_3$, are stirred with a teflon-coated stir bar in a polyethylene beaker. Sodium hydroxide, NaOH, available in "rayon" grade or "diaphragm cell" grade from Olin Chemicals (Niagara Falls, N.Y.) or Occidental Chemical Corporation (Niagara Falls, N.Y.), is diluted from 19 Molar (19M) to 1 Molar concentration and added to the solution in the beaker until the pH of the solution is between 9.4 and 9.8. To this solution is added 1.8 grams of technical grade sodium fluoride, NaF, available from Olin Chemicals. The solution is maintained at a temperature of 40°-50° C. on a hot plate and stirred for 30 minutes. The pH is checked to ensure that it is still between 9.4 and 9.8. The solution is then filtered through Whatman 42 filter paper that has been precoated with Solka-Floc cellulose filter aid into a polyethylene filter flask.

One hundred twenty five milliliters of the filtrate is then combined with an equal volume of deionized water to prevent crystallization of the hexammine cobalt chloride upon cooling to room temperature. This diluted sample is then analyzed for silicon content by inductively coupled plasma atomic emission spectroscopy. Cobalt, magnesium and calcium analysis is done by atomic absorption spectroscopy. The results of this analysis are summarized in Table I below.

EXAMPLE II

The procedure of Example I is followed, with these exceptions: instead of 1M sodium hydroxide, 19M sodium hydroxide is used to adjust the pH to between 9.4 and 9.8. After the addition of the sodium fluoride (1.8 grams), an aqueous ferric chloride solution, $FeCl_3$, containing 50 grams of ferric ions per liter of solution, is added until the ferric ion concentration in the cobalt solution is 50 milligrams/liter of solution. The ferric chloride is made from Grade H iron powder obtained from Belmont Metals, Inc. (Brooklyn, N.Y.). The solution is heated and stirred as in Example I. 1N sodium hydroxide is added as needed to adjust the pH of the cobalt solution to between 9.4 and 9.8. The solution is filtered, washed and analyzed as in Example I.

EXAMPLE III

The procedure of Example I is followed, with these exceptions: instead of 1M sodium hydroxide, 19M sodium hydroxide is used to adjust the pH to between 9.4 and 9.8. After the addition of the sodium fluoride (1.8 grams), an aqueous ferric chloride solution, $FeCl_3$, containing 50 grams of ferric ions per liter of solution, is added until the ferric ion concentration in the cobalt solution is 1000 milligrams/liter of solution. The solution is heated and stirred as in Example I. 1N sodium hydroxide is added as needed to adjust the pH of the cobalt solution to between 9.4 and 9.8. The solution is filtered, washed and analyzed as in Example I.

TABLE I

IMPURITY LEVELS IN TREATED COBALTIC HEXAMINE CHLORIDE SOLUTION

|  | Si (mg/l) | Co (g/l) | Mg (ppm) | Ca (ppm) |
|---|---|---|---|---|
| EXAMPLE I (No $Fe^{+3}$) | 6.0 | 11.1 | 1-10 | 5-50 |
| EXAMPLE II (50 mg/l $Fe^{+3}$) | 1.2 | 11.3 | 1-10 | 5-50 |
| EXAMPLE III (1000 mg/l $Fe^{+3}$) | 0.2 | 9.9 | 1-10 | 5-50 |

The data in Table I indicate that silicon impurity levels in the aqueous hexammine cobalt (III) chloride solution decrease with increasing ferric ion ($Fe^{+3}$) concentration.

While there has been shown and described what at present are considered the preferred embodiments of the invention, it will be obvious to those skilled in the art that various changes and modifications may be made therein without departing from the scope of the invention as defined by the appended claims.

We claim:

1. A method for reducing impurity levels of calcium, magnesium and/or silicon in hexammine cobalt halide compounds, comprising the steps of: adjusting the pH of an aqueous hexammine cobalt halide solution to at least 9; adding sufficient soluble fluoride to form insoluble fluoride compounds of any magnesium and/or calcium impurities; adding ferric ions to said aqueous hexammine cobalt halide solution to form insoluble compounds of ferric hydroxide and any silicon impurity; and filtering said aqueous hexammine cobalt halide solution to obtain a purified aqueous hexammine cobalt halide solution.

2. The method of claim 1 wherein said aqueous hexammine cobalt halide solution consists essentially of aqueous hexammine cobalt (III) chloride.

3. The method of claim 1 wherein said pH of said aqueous hexammine cobalt halide solution is adjusted to between 9.4 and 9.8.

4. The method of claim 1 wherein said pH of said aqueous hexammine cobalt halide solution is adjusted with sodium hydroxide.

5. The method of claim 1 wherein said soluble fluoride is sodium fluoride.

6. The method of claim 5 wherein said sodium fluoride is added to said aqueous hexammine cobalt halide solution in a concentration of at least 3.6 grams of sodium fluoride per liter of said solution.

7. The method of claim 1 wherein the source of said ferric ions is ferric chloride.

8. The method of claim 1 wherein said ferric ions are added to said aqueous hexammine cobalt halide solution in a concentration of at least 50 milligrams of ferric ions per liter of said solution.

9. The method of claim 1 wherein said ferric ions are added to said aqueous hexammine cobalt halide solution in a concentration of at least 1000 milligrams of ferric ions per liter of said solution.

10. A method for reducing impurity levels of calcium, magnesium and/or silicon in hexammine cobalt halide compounds, comprising the steps of: adjusting the pH of an aqueous hexammine cobalt halide solution to at least 9; adding ferric ions to said aqueous hexammine cobalt halide solution to form insoluble compounds of ferric hydroxide and any silicon impurity; and filtering said aqueous hexammine cobalt halide solution to obtain a purified aqueous hexammine cobalt halide solution.

11. The method of claim 10 wherein said aqueous hexammine cobalt halide solution consists essentially of aqueous hexammine cobalt (III) chloride.

12. The method of claim 10 wherein said pH of said aqueous hexammine cobalt halide solution is adjusted to between 9.4 and 9.8.

13. The method of claim 10 wherein said pH of said aqueous hexammine cobalt halide solution is adjusted with sodium hydroxide.

14. The method of claim 10 wherein the source of said ferric ions is ferric chloride.

15. The method of claim 10 wherein said ferric ions are added to said aqueous hexammine cobalt halide solution in a concentration of at least 50 milligrams of ferric ions per liter of said solution.

16. The method of claim 10 wherein said ferric ions are added to said aqueous hexammine cobalt halide solution in a concentration of at least 1000 milligrams of ferric ions per liter of said solution.

* * * * *